US006014089A

United States Patent [19]
Tracy et al.

[11] Patent Number: 6,014,089
[45] Date of Patent: Jan. 11, 2000

[54] METHOD FOR TRANSMITTING DATA USING A DIGITAL CONTROL CHANNEL OF A WIRELESS NETWORK

[75] Inventors: Michael J. Tracy, Scottsbluff; Robert L. Hinze, Gering, both of Nebr.

[73] Assignee: Tracy Corporation II, Scottsbluff, Nebr.

[21] Appl. No.: 08/920,085

[22] Filed: Aug. 26, 1997

Related U.S. Application Data

[63] Continuation-in-part of application No. 08/740,361, Oct. 28, 1996.

[51] Int. Cl.$^7$ .................................................... H04J 3/12
[52] U.S. Cl. ........................ 340/870.02; 379/106.03; 379/56.3; 348/6; 455/466; 370/349
[58] Field of Search ................... 340/870.02, 541; 379/59, 58, 63, 106.01, 106.03, 56.3; 370/328, 349, 474, 522, 524; 455/466; 702/61, 62; 348/6

[56] References Cited

U.S. PATENT DOCUMENTS

| | | | |
|---|---|---|---|
| 3,566,384 | 2/1971 | Smith et al. | 340/200 |
| 3,778,771 | 12/1973 | Whitaker | 340/150 |
| 4,008,458 | 2/1977 | Wensley | 340/151 |
| 4,022,977 | 5/1977 | Nomura | 179/2 AM |
| 4,035,772 | 7/1977 | Abe et al. | 340/151 |
| 4,135,181 | 1/1979 | Bogacki et al. | 340/310 A |
| 4,296,411 | 10/1981 | Romanelli et al. | 340/870.02 |
| 4,315,251 | 2/1982 | Robinson et al. | 340/310 A |
| 4,394,540 | 7/1983 | Willis et al. | 179/2 AM |
| 4,396,915 | 8/1983 | Farnsworth et al. | 340/807.03 |
| 4,415,853 | 11/1983 | Fisher | 324/74 |
| 4,491,793 | 1/1985 | Germer et al. | 324/157 |
| 4,538,029 | 8/1985 | Gazzoli et al. | 179/2 |
| 4,630,211 | 12/1986 | Pettis | 364/464 |
| 4,720,851 | 1/1988 | Smith | 379/107 |
| 4,749,992 | 6/1988 | Fitzemeyer et al. | 340/870.02 |
| 4,803,632 | 2/1989 | Frew et al. | 364/464.04 |
| 4,833,618 | 5/1989 | Verma et al. | 364/483 |
| 4,856,054 | 8/1989 | Smith | 379/107 |
| 4,940,976 | 7/1990 | Gastouniotis et al. | 340/870.02 |
| 5,010,568 | 4/1991 | Meriam et al. | 397/107 |
| 5,014,213 | 5/1991 | Edwards et al. | 364/483 |
| 5,161,182 | 11/1992 | Merriam et al. | 397/107 |
| 5,214,587 | 5/1993 | Green | 364/464.04 |
| 5,481,546 | 1/1996 | Dinkins | 370/95.1 |
| 5,526,403 | 6/1996 | Tam | 379/59 |
| 5,544,227 | 8/1996 | Blust et al. | 379/63 |
| 5,546,444 | 8/1996 | Roach, Jr. et al. | 379/59 |
| 5,548,631 | 8/1996 | Krebs et al. | 379/58 |
| 5,553,094 | 9/1996 | Johnson et al. | 375/200 |
| 5,594,740 | 1/1997 | LaDue | 455/910 |
| 5,668,538 | 9/1997 | Warwick | 340/870.02 |
| 5,675,371 | 10/1997 | Barringer | 348/6 |
| 5,748,104 | 5/1998 | Argyroudis | 340/870.11 |
| 5,845,203 | 12/1998 | LaDue | 455/466 |
| 5,845,215 | 12/1998 | Henry | 455/553 |
| 5,850,180 | 12/1998 | Hess | 340/541 |
| 5,892,758 | 4/1999 | Argyroudis | 340/870.02 |

OTHER PUBLICATIONS

Michael Mouly and Marie–Bernadette Pautet, The GSM System for Mobile Communications, 1992.
Thomas F. Evans, Bell South Cellemetry advertising brochure, May and Jun. 1996.
Evans, Cellemetry® Data Service—Telemetry Via Cellular, pp. 1–9, 1998 Cellemetry LLC.
Senses et al., "GSM Handset Vulnerabilities, Part II: Physical Layer Protocol", pp. 26–32, Communications Systems Design, Aug. 1998.
Mouly et al., "An Introduction to GSM", Nortern Telecom, Inc., 1993.
Mouly et al., "The GSM System for Mobile Communications", 1993, pp. 300–306 and 556–565.

*Primary Examiner*—Michael Horabik
*Assistant Examiner*—Albert K. Wong
*Attorney, Agent, or Firm*—Sheridan Ross P.C.

[57] ABSTRACT

An apparatus and method for transmitting data to and from a data collection device using the short message service functionality of the control channel of a personal communications system transmission protocol is disclosed. The method includes first transmitting a request for data from a remote device to the data collection device using the short message service portion of the digital personal communications system control channel transmission protocol. The requests are received a the data collection device and interpreted. According to the interpretation, the data collection device compiles the data that was requested by the remote device. The compiled data is transmitted to the remote device using the short message service portion of the digital personal communications system control channel transmission protocol.

27 Claims, 8 Drawing Sheets

METHOD FOR TRANSMITTING DATA USING A DIGITAL CONTROL CHANNEL OF A WIRELESS NETWORK

REFERENCE TO RELATED APPLICATION

This application is a continuation-in-part of a copending application having a Ser. No. of 08/740,361, filed on Oct. 28, 1996.

FIELD OF THE INVENTION

The present invention relates generally to the remote monitoring of usage information, and in particular to an apparatus and associated method for transmitting, receiving, storing, processing and digitally re-transmitting the information directly to a remote receiving device via various methods to include personal communications systems using Global Standards for Mobile Communications (GSM), Time Division Multiple Access (TDMA) Technology, Code Division Multiple Access (CDMA), Frequency Division Multiple Access (FDMA), Personal Access Communications System (PACS) or any other personal communications system that employs a digital control channel.

BACKGROUND OF THE INVENTION

Presently, many utility meters are monitored by having an employee visually inspect each meter, and record the usage data. Several methods and devices have been proposed to automatically collect the utility usage data thereby reducing the labor involved in collecting the utility usage data.

In U.S. Pat. No. 4,803,632, Frew, et al. disclose a device for monitoring utility usage. The device is independently powered and is capable of short range infrared transmission of the utility usage data. A wand is also provided that is capable of receiving the transmitted data. A meter-reading employee uses the wand by placing it close to the monitoring device to receive the data which is electronically stored in a transportable unit carried by the employee. The employee then brings the electronically stored data to the utility company where it is downloaded from the transportable unit and used to calculate the customer's utility usage bill.

U.S. Pat. Nos. 5,010,568 and 5,161,182, by Merrian, et al. disclose a utility usage monitor that connects to the customer's telephone line via a modem. The usage monitor calculates and stores the customer's utility usage data. The utility company periodically calls the monitoring unit, and when a modem connection between the utility company and the monitoring unit is established, the monitoring unit sends the usage data to the utility company and the data is used to calculate the customer's usage bill.

In U.S. Pat. No. 4,940,976, Gastouniotis, et al. disclose a device that monitors utility usage data. The customer's utility usage data is collected by a unit located in the customer's residence. The monitoring unit sends the usage data via a radio frequency to an intermediate storage station where usage data from up to 10,000 residences is capable of being stored. Periodically, the intermediate station sends the stored data to the utility company by either a radio frequency link, a cable TV line or telephone line. Subsequently, the utility usage data is used to calculate the customer's bill.

A need exists for a system that is capable of monitoring utility usage and other information on varying reading schedules and different levels of frequency of data interrogation (profiling), and is capable of wirelessly transmitting digital data to a desired remote device.

Accordingly, it would be advantageous to provide a data collection device that receives information from utility meters and other devices.

It would further be advantageous to provide for digital transmission of the information to a remote receiving device, and in one embodiment the information should be capable of being transmitted via GSM, PACS, FDMA, CDMA or TDMA digital technology operating at any frequency.

It would also be advantageous for the data collection device to provide an interface with telecommunications wiring at a location so as to provide a connection to a cellular, personal communications system or equivalent wireless network.

It would be advantageous to provide a device that is capable of receiving requests for data and is capable of transmitting data using the short message service of the personal communications system protocol.

SUMMARY OF THE INVENTION

According to the present invention, an apparatus is provided for automatically collecting data and digitally transmitting that data to a remote receiving device, and the data is capable of being transmitted in one embodiment using GSM, PACS, FDMA, CDMA or TDMA digital technology. These transmission protocols represent mobile telecommunications systems that operate on a specified radio frequency bandwidth that are capable of digital speech transmission. The apparatus includes a device for sensing and collecting data at a first location. If the sensed data is analog, then the analog data is converted to digital data. The collected data may be transmitted to a data collection device for storage and/or processing before the data is digitally transmitted to the desired remote device. Within the data collection device is a device for processing and storing which is also used to convert and encode the data into a desired format and electronically store the data. The device for processing and storing can include a central processing unit (CPU) for processing the collected data, erasable programmable memory (EPROM) for storing a program to process the collected data and random access memory (RAM) for storing the data before it is transmitted.

Periodically, or when prompted by an interested party, the apparatus transmits the digital data to a remote receiving device via a telecommunications unit and network using GSM, PACS, FDMA, CDMA or TDMA digital technology on any radio frequency. The GSM, PACS, FDMA, CDMA or TDMA network transmits the stored and/or processed data on a digital GSM, PACS, FDMA, CDMA or TDMA control channel and the data is delivered to the remote receiving device. In one embodiment, the apparatus is capable of transmitting the data over the personal communications system network utilizing frequencies of about 1900 Mhz.

Although the present invention is described in relation to personal communications system networks using GSM, PACS, FDMA, TDMA or CDMA technology, it should be appreciated that personal communication systems may encompass any other wireless system that employs the use of a digital control channel to transmit information to a remote receiving device.

In another embodiment, the apparatus for automatically collecting data can be connected via a connecting device to a user's telecommunications system (e.g., existing hardwired telephone system) to create a connection to a wireless telecommunications network (e.g., GSM, PACS, FDMA, TDMA or Code Division Multiple Access (CDMA) network). Thus, a connection in this manner allows for voice or data transmission over the wireless telecommunications network using the existing telecommunications wiring at a location.

In addition, the meter usage data can be electronically stored within the meter reading device. Also, the data can be subsequently transmitted to another location via a wired or wireless connection. The wireless transmission of the data may be sent over a frequency band that has not been licensed for commercial use. The transmitted data is capable of being received by the data collection device and subsequently digitally transmitted.

In another aspect of the invention, data is transmitted to and from the data collection device using the short message service portion of personal communications system transmission protocol. The short message service portion of the personal communications system transmission protocol is a means to send a protocol specific number of characters of data to and from mobile subscribers (MS), i.e. a device capable of transmitting via the personal communications system. A method for transmitting a data sequence via personal communications system transmission protocol is disclosed. The method includes first transmitting a request for data from a remote device to the data collection device using the short message service portion of the personal communications system transmission protocol. The request is received at the data collection device and interpreted. According to the interpretation of the request, the data collection device compiles the data that was requested by the remote device. The compiled data is, again, transmitted to the remote device using the control channel of the short message service portion of the personal communications system transmission protocol.

On request from the remote device the compiled data consists of data that is received by the data collection device. This data is then stored as it is received, using a time stamp functionality. This time stamp device provides electronic circuitry that is capable of providing a time relationship to the data that is capable of being stored in electronic memory in the collection device for compilation and release on query from the remote device. The time stamping enables the data to bear a relationship to the period of time over and during which it may have been collected. This time relationship is useful in developing usage profiles for later reporting or consumption profiles of data which might reflect the period of time during which items were consumed, the consumption was monitored and consumption data was collected, stored and held in the data collection device. The various parameters including frequency of collection, related time stamping, and notification of consumption. Each of these specified parameters may be changed or altered on request and in conformance with requests and instructions received from the remote device.

The step of transmitting the request for data includes accessing the short message service portion of the personal communications system transmission protocol. The data sequence is transmitted by the remote device to the data collection device via the short message service portion of the personal communications system transmission protocol. The short message service data is received by the data collection unit and the request for data is interpreted. When the data has been compiled according to the request, the data collection unit accesses the short message service portion of the personal communications system transmission protocol. The compiled data is formatted as a short message containing the data which was previously requested from the remote device. The data sequence is transmitted from the data collection device to the remote device using the short message service portion of the personal communications system transmission protocol.

The personal communications system transmission protocol includes several standard wireless transmission systems. These systems include a global system for mobility (GSM) technology network, a time division multiple access (TDMA) technology network, a code division multiple access (CDMA) technology network, frequency division multiple access technology network (FDMA) or personal access communications system technology network (PACS), among others. In addition, the method may be used on any wire or wireless transmission system that employs a digital or analog transmission protocol system.

DETAILED DESCRIPTION

One aspect of the invention is directed to an automatic meter reading apparatus for collecting and transmitting utility usage and other information. The data collection device collects data from utility meters and other devices, and the data can be transmitted to the data collection device via a wired or wireless connection. Within the data collection device is a wireless transmitter/receiver that is capable of digitally transmitting the data to a remote device, such as to a utility company over a personal communications system using GSM, PACS, FDMA, TDMA or CDMA technology and receiving data from the remote device. The remote device is capable of interrogating individual data collection devices because the wireless telecommunications technology allows each individual data collection device to have an unique address.

Another aspect of the present invention is directed to an improved meter reading device that has an increased depth of focus. The improved reader includes an electromagnetic radiation (e.g. optical or infrared) transmitter and receiver. In addition, a device for reflecting an electromagnetic beam is provided such that the beam is optically coupled between the transmitter, receiver and a rotatable disk, dial or mechanical type indicator provided in a utility meter. The improved meter reader is capable of being integrated into existing meters without having to replace each existing utility meter.

Figure 2:
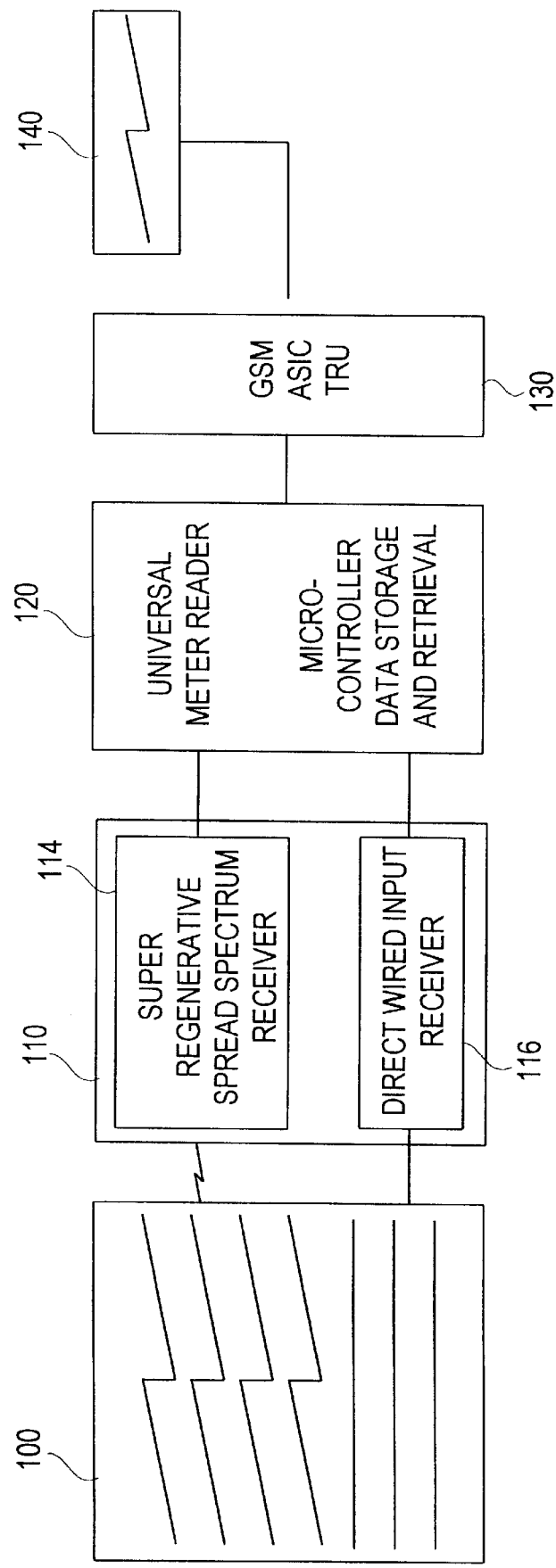
FIG. 2 is a block diagram of another embodiment of the communications system of the present invention.

In FIG. 2, a block diagram of an data collection device includes a data collection receiver 110 that is connected to meters or other devices 100. The data collection receiver 110 includes a direct wired input receiver 116 for those meters or other devices 100 that are directly wired to receiver 110, and a super regenerative or spread spectrum receiver 114 is included for those meters or devices 100 that are wirelessly connected to receiver 110. A data collection device 120 is connected to data collection receiver 110 and is capable of calculating and storing meter usage data from any presently existing meter readers or other devices. Also, a GSM, PACS, FDMA, CDMA or TDMA telecommunication unit 130 is connected to the data collection device 120 such that the data received from the meters 100 is capable of being digitally transmitted over a GSM, PACS, FDMA, CDMA or TDMA digital technology network control channel to a remote device or location 140.

In one embodiment, the data collection device can be miniaturized and located behind an electrical meter. This embodiment contains a transceiver that is capable of transmitting and receiving information over a digital GSM, PACS, FDMA, CDMA or TDMA network. In addition, this embodiment can also contain a receiver for collection of data from wireless meter readers associated with the data collection device.

Figure 3:
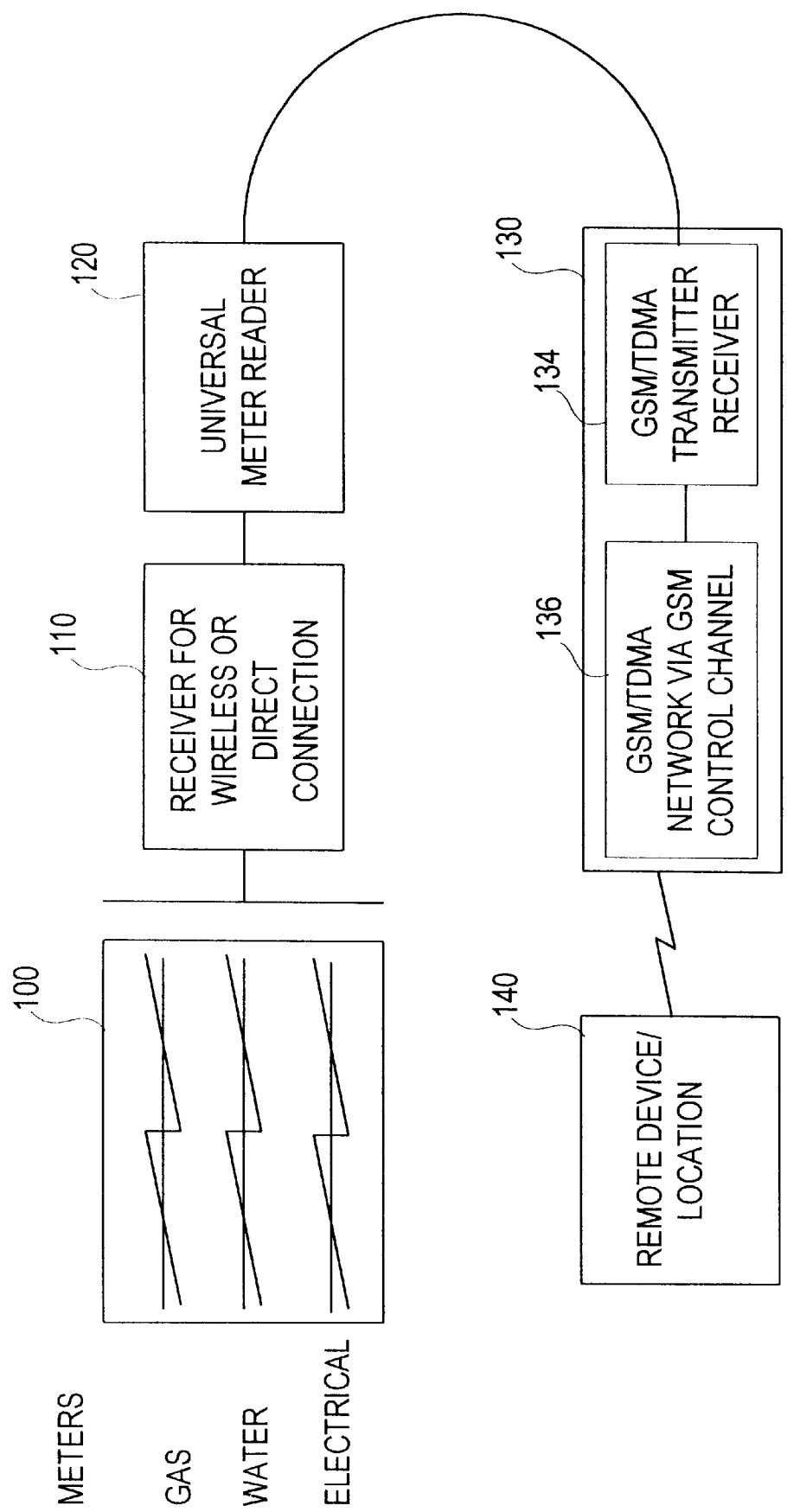
FIG. 3 is a block diagram of an data collection device.

Referring to FIG. 3, the GSM, PACS, FDMA, CDMA or TDMA telecommunications unit 130 includes a GSM, PACS, FDMA, CDMA or TDMA transmitter/receiver 134 that receives data from the data collection device 120. The GSM, PACS, FDMA, CDMA or TDMA transmitter/receiver is then capable of digitally transmitting data to and from a remote receiving device 140 via the GSM, PACS, FDMA, CDMA or TDMA network control channel 136. The personal communications system network contains spectrum assignments between 1850 to 1990 Mhz (referred to herein as the 1900 Mhz bandwidth). In a preferred embodiment, the GSM, PACS, FDMA, CDMA or TDMA transmitter operates over a frequency range of 1850 to 1990 Mhz. It should further be appreciated that the data collection device of the present invention may be used in conjunction with any wireless network that employs a digital control channel for transferring information. In addition to existing wireless network technologies such as personal communications system, GSM, TDMA, CDMA, Frequency Division Multiple Access (FDMA) and Personal Access Communications System (PACS), the present invention is envisioned to be used in connection with other wireless network technologies that may be developed and that employ the use of a digital control channel to transfer information.

Figure 1:
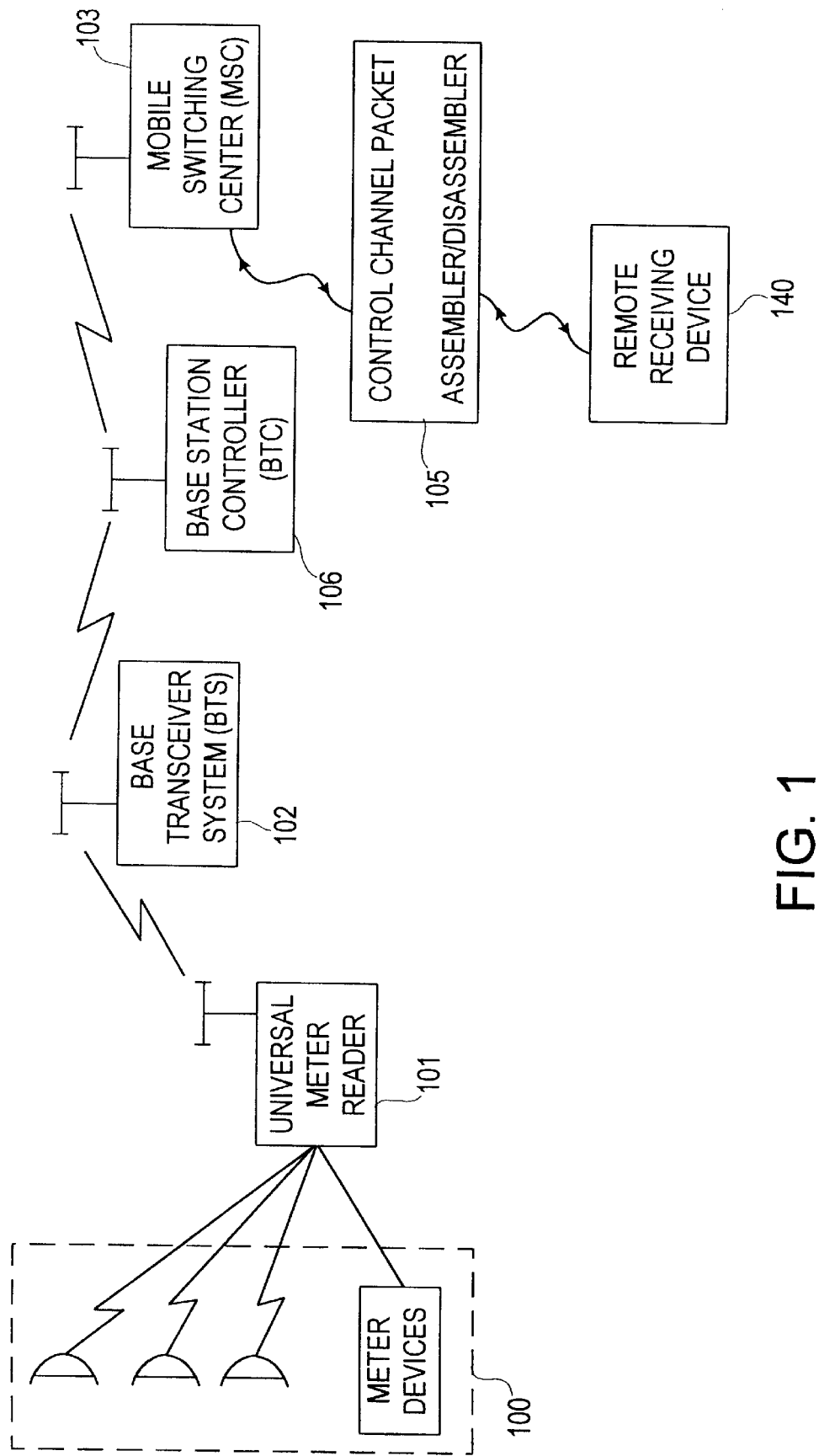
FIG. 1 is a block diagram of one embodiment of the communications system of the present invention.

Referring to FIG. 1, the data from all of the meters 100 is transmitted to the data collection device 101, for example by a wired or radio frequency connection. The data collection device 101 is also capable of receiving data from meters that have been manufactured by various companies. The data from the data collection device 101 is transmitted over a network infrastructure to a base transceiver system (BTS) 102 using a digital control channel. From the BTS 102, the data is transmitted to a base station controller (BSC) 106. Then from the BSC 106, the data is transmitted to a mobile switching center (MSC) 103. A control channel packet assembler/disassembler 105 is physically located at the MSC 103. At this location, the data stream is transmitted in a common data format (e.g., Integrated Services Digital Network (ISDN), etc.) Data is transmitted over the control channel in continuous transmission units. Each transmission unit contains a specific number of transmission packets (e.g., under personal communications system wireless networks there are five transmission packets per transmission unit). Since the control channel is generally under utilized, many of the transmission packets contain no wireless network transmission information, such packets are known as "dummy" packets.

The control channel packet assembler/disassembler 105 continuously monitors the data steams and can separate the control channel transmission packets necessary for system control or other system information from other channel transmission packets with other characteristics. To this end, it should also be appreciated that although the control channel assembler/disassembler 105 is physically located at the MSC 103, it may be logically located at any point between the BTS 102 and the MSC 103. Each data packet has a "header" which contains a specific numeric configuration which identifies a packet as a "dummy" packet, GSM control packet or a specific data packet. Specific transmission packets transferred to and from the data collection device 101 are detected by the control channel packet assembler/disassembler 105, "stripped", interrogated, quantified and simultaneously replaced by a "dummy" packet which is, then, transmitted to the MSC 103. The "stripped" packets that contain information from the data collection device 101 may be transmitted to the remote receiving device 140 to be processed. Conversely, instructional information for the data collection device 101 may be transferred from the remote receiving device 140 to the control channel packet assembler/disassembler 105 and introduced into the control channel by stripping a dummy packet and inserting a control data packet with the instructional information in the data stream. The instructional information is transmitted back to the data collection device 101 via the MSC 103, BSC 106 and the BTS 102. Accordingly, the control channel packet assembler/disassembler 105 is operated in tandem on both the inbound and outbound control channels between the BSC 106 and the MSC 103. In one embodiment, the control channel packet assembler/disassembler 105 can be a computer that has been programmed to perform the functions mentions hereinabove.

More specifically, the present invention utilizes removal of the "dummy" packets that contain no information and replacing these packets with diverted transmission packets. The diverted transmission packets can contain data and instructions that are used by the remote device to control the individual data collection devices. In addition, the diverted transmission packets can contain data that the data collection device sends to the remote device. The diverted transmission packets can be diverted between the BTS 102 and the MSC 103. The diverted transmission packets are replaced with "dummy" transmission packets making the operation of this system transparent to the MSC 103. Operating in this manner, the remote receiving device 140 and the data collection device 101 create a two way communications link.

Under the GSM, PACS, FDMA, CDMA or TDMA technology, there are 8 logical channels per radio frequency channel which are available for communication of which 7 channels are used for voice/data transmission and 1 channel is used as a control channel. The control channel is normally used by the GSM, PACS, FDMA, CDMA or TDMA network to verify the caller's identification and billing information. In addition, the control channel is used for switching the caller between communication towers typically when the caller is close to becoming out of the range of a transmitting tower. As such, there are times when the control channel is not in use by the digital GSM, PACS, FDMA, CDMA or TDMA communications network. During this non-use time, the data collection device 101 is capable of transmitting data over the network system without interfering with other control channel transmissions. In the present invention, the GSM, PACS, FDMA, CDMA and TDMA control channel is always fully in use with streams of transmission packets, but the majority of the transmission packets consist of "dummy" transmission packets, as explained hereinabove. The "dummy" packets can be "stripped" from the data stream in route to the BTS 102. The packets that are "stripped" are replaced with dummy transmission packets that contain address and instruction for the data collection device 101.

The address information contains a unique address for each individual data collection device. Therefore, the present invention is capable of communicating with individual data collection devices because information may be sent to the unique address of the desired data collection device. The diverted transmission packets which are received via the GSM, PACS, FDMA, CDMA or TDMA BTS 102 are stripped and not forwarded to the MSC 103. This packet "stripping" allows this system to be installed without software modification to the home location register (HLR), vehicle location register (VLR) or MSC 103. As such, the data collection device 101 is capable of transmitting or receiving data at any prescribed or requested time. Thus, data can be transmitted or received at times when other control channel transmissions are at a minimum. Data transmitted over the control channel is digital, and therefore the digital data from the data collection device 120 may be transmitted over the GSM, PACS, FDMA, CDMA or TDMA network, and therefore removing the need of a digital-to-analog conversion.

Existing meter interrogation systems are not intelligent and cannot interrogate individual or specific devices. Such systems, through the network transmission system, issue a command to all meters in a certain portion of the network to report. Those zoned meters then transmit data on a sequential (timed) basis. The meters receive this command and then report the data via the wireless network multiple times, independent of any other readings which might be taking place at this same time. This operational theory assumes that the meters' data transmissions will not interfere with each other through this staggered interrogation and transmission scheme, and that one of the multiple readings (if not more) will reach the data collection point in an uncorrupted manner.

In the present invention, the data collection device transmits data when requested to do so by the GSM, PACS, FDMA, CDMA or TDMA signal. Therefore, it is possible to read single meters without activating all of the meters in a zone to do so. This operation of interrogating meters decreases the amount of traffic on the GSM, PACS, FDMA, CDMA or TDMA control channels and optimizes the efficiency of the system operation.

Figure 4:
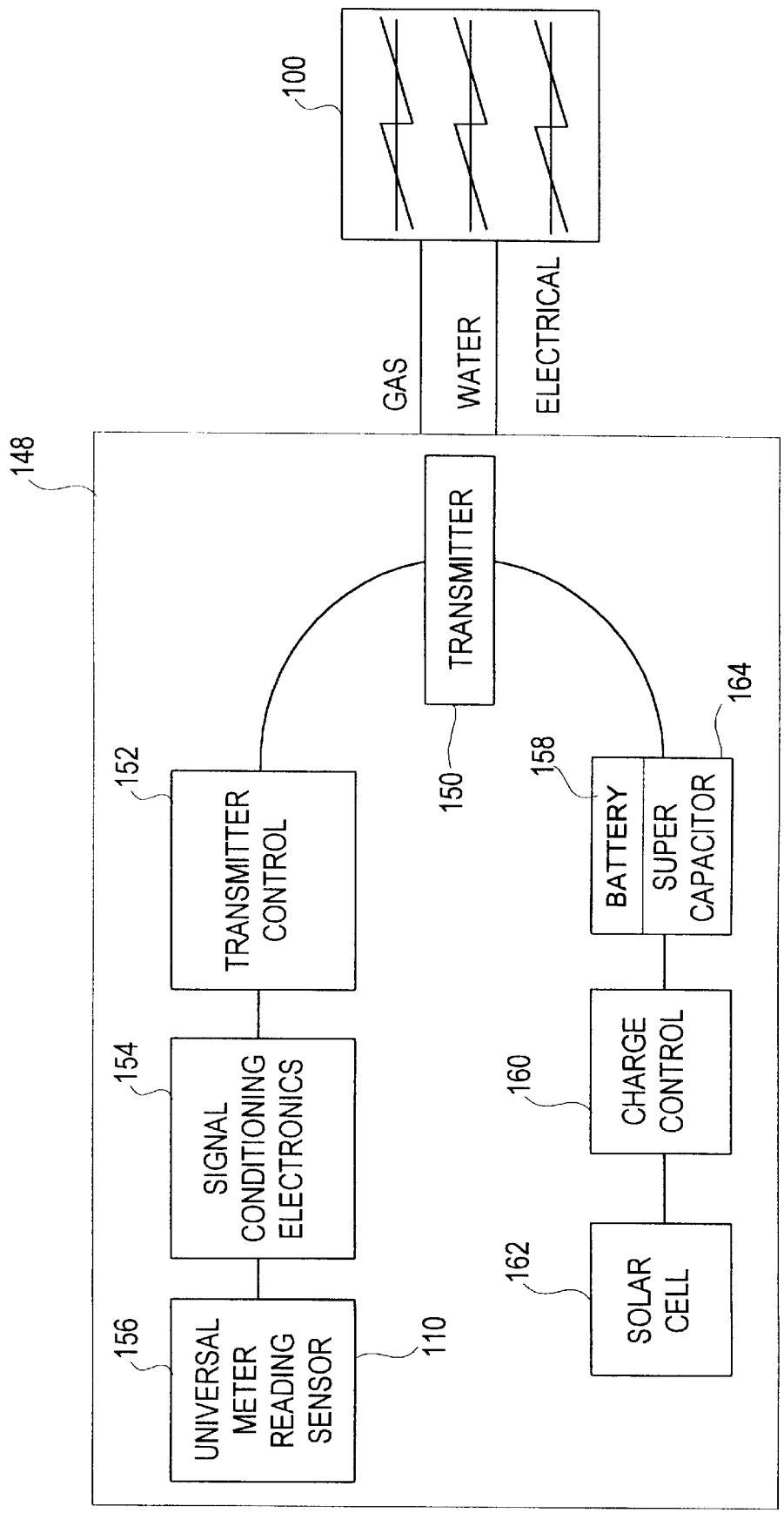
FIG. 4 is a block diagram of a remote meter reader.

Referring to FIG. 4, the meters or other devices 100 may be remotely located from the data collection device 120 (see FIGS. 3 and 5) and connected by a wireless data collection unit 148. The data that is collected from meters or other devices 100 is capable of being processed and stored by the universal meter reading sensor 156. The data is conditioned and preferably encrypted before transmission using signal conditioning electronics 154. Periodically, the transmitter control 152 directs the transmitter 150 to send the data to the super regenerative or spread spectrum receiver 114, shown in FIG. 2. The transmitter 150 is capable of operating on unlicensed radio frequencies, such as 27, 49, 300 or 902–928 Mhz using either frequency modulation (FM) or amplitude modulation (AM). Preferably, the transmitter 150 will operate over the frequency range of 902–928 Mhz using amplitude modulation.

The transmission of the data from the transmitter 150 to the data collection device 120 (shown in FIG. 2) can be accomplished by using an inductive (L) and capacitive (C) super regenerative circuit, described in detail hereinbelow. The LC circuit is a fairly inexpensive alternative for short distance wireless transmission of data. After the data is sent to the LC receiver 114 (shown in FIG. 2), it may be sent to a remote device or location, as explained hereinabove, using the GSM, PACS, FDMA, CDMA or TDMA telecommunications unit 130, also shown in FIG. 2.

As shown in FIG. 4, the wireless data collection unit 148 can be remotely powered by a battery 158 that can be charged by a solar cell 162. The charge control unit 160 regulates the power from the solar cell 162 such that battery 158 and super-capacitor 164 are charged. In the event of power loss, the super-capacitor 164 may be used as a backup power source. In another embodiment, the wireless data collection unit is powered by long life batteries.

Figure 5:
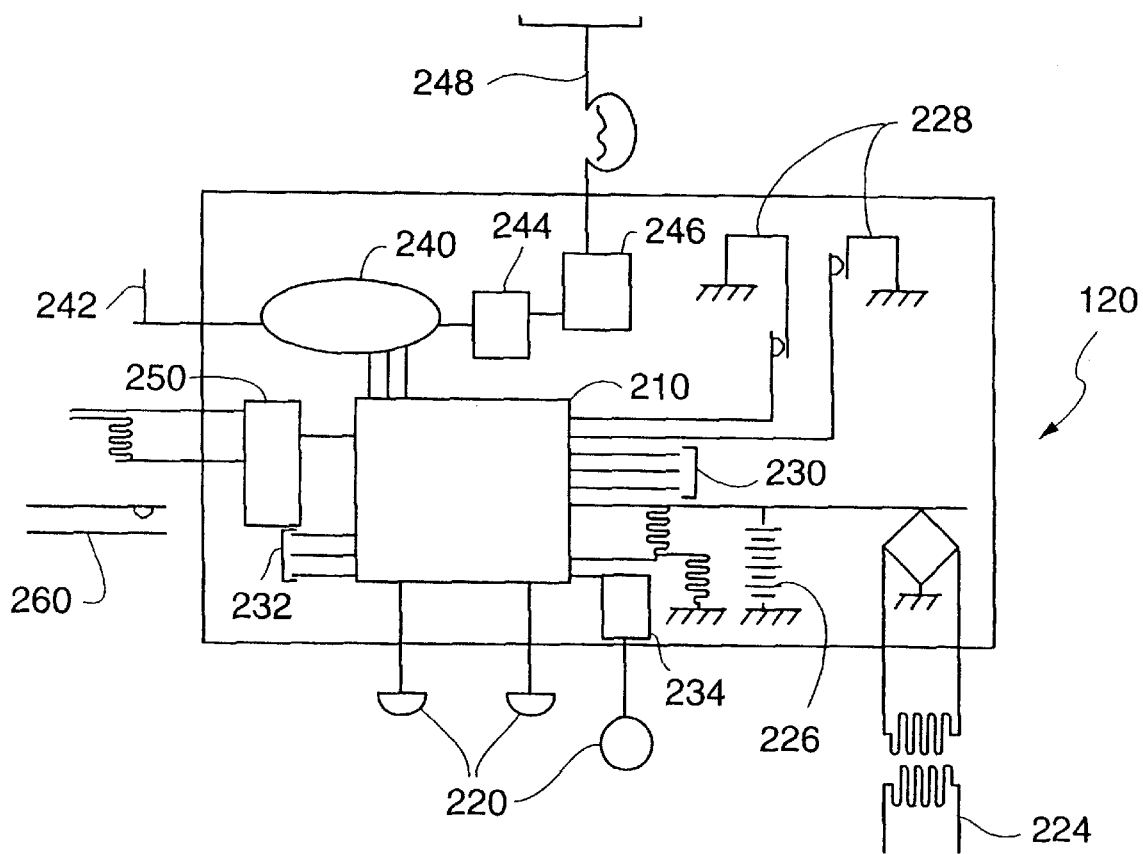
FIG. 5 is a block and schematic diagram of an embodiment of the data collection device.

Referring to FIG. 5, the data collection device 120 further includes a data collection unit 210. In one embodiment, the data collection unit 210 includes a central processing unit (CPU) that has an electronic memory such as erasable programmable read-only memory (EPROM) and a real-time clock. These devices are used to store, time stamp and process the most recent meter output or other data. The data processing program/algorithm that is used by the CPU to process the utility data is stored in the EPROM via program data lines 230, and for security purposes, after initially programming the CPU, the data processing program/algorithm cannot be changed. In the event that the data, the algorithm or any physical part of the data collection device 120 itself is tampered with, the universal meter reading 120 is capable of detecting the false data or algorithm or physical intrusion and can send a security breach signal to the remote receiving device (e.g., the utility company computers).

The CPU has a plurality of data input and output (I/O) lines. Therefore, the I/O lines that are not in use by the utility devices may be used for additional applications. For example, the additional lines may be connected to a home security unit having a number of sensors throughout the home. When a sensor detects an intrusion, the data collection device 120 is capable of transmitting that breach to a remote device located, for example, at a police station. Other home applications include a home health monitoring device that can be capable of detecting the health status of a patient and transmit that data to a hospital.

In another embodiment, the data collection device may use additional I/O lines to monitor the usage of vending machines or the like. For example, each vending machine located in a building can be capable of transmitting its usage data to the universal meter reading which, in turn, transmits that usage data to the vending company. Therefore, the vending company can restock the vending machines without wasting manpower by having to manually check each machine. The invention also encompasses applications for irrigation sprinkler systems monitoring and control, oil well monitoring and control, sewage/water monitoring at industrial sites, smokestack emissions monitoring, real-time monitoring of air quality in metropolitan areas, remote weather monitoring and power failure location monitoring.

The utility usage data is obtained from meters 220, and additional data lines 232 are available for monitoring other devices. Meters 220 may be hard-wired or wirelessly connected to the data collection unit 210. When the meters 220 are wirelessly connected, the data is preferably transmitted over unlicensed frequency bands, preferably over the frequencies of 27, 49, 300 or 902–928 Mhz.

The data collection device, is capable of reading multiple status and usage inputs compared to other devices which read each device as an individual element. The data collection device conditions the data through the CPU to provide a more efficient usage of technology and spectrum. In addition, the data collection device can interface to many devices with wired or wireless media and inputs.

When using wireless collection between the data collection device and meters being read at a given site, the receivers and transmitters are extremely low in cost, low in technical criteria and are similar to keyless entry systems. The security and reliability of this low cost system is achieved through CPU error checking in the data collection device. Data from a wireless meter is periodically transmitted multiple times on a variety of closely spaced, unlicensed radio frequencies. The CPU in the data collection device controls a low cost LC super regenerative receiver to rapidly sequence through the frequencies seeking a valid signal to lock to. When the signal is received and locked, the CPU inspects the data for errors and wireless meter reader serial number prior to accepting and storing the data (in this example a meter reading) for storage and later transmission via the GSM, PACS, FDMA, CDMA or TDMA system to the data collection point.

Furthermore, the universal meter reading system is low cost because it utilizes the modification of existing meter infrastructure and simply adds an optical/infrared reader which is much less costly than replacing an installed meter with a meter equipped with reading electronics contained therein. Further, multiple meters and alarms are read at one site by one data collection device. As explained earlier, through the utilization of the GSM, PACS, FDMA, CDMA or TDMA control packet data collection system, there are no software modifications necessary to any of the GSM, PACS, FDMA, CDMA or TDMA transmitting or receiving equipment.

As explained above, the transmission of data from the meters 220 to the data collection unit 210 may be accomplished by using an LC super regenerative circuit to create a wireless connection between the unit 210 and the meters 220. In addition, when the meters 220 are wirelessly connected, signal conditioning electronics 234 are used to filter any electromagnetic noise in the transmitted signal. The signal conditioning electronics 234 may also be used when the meters 220 are hard-wired to the connection unit 210 in order to filter noise and deliver a clean logic signal to the data collection unit 210.

Also shown in FIG. 5, opto-triac switch 250 is used for controlling the coil of the load shedding relay contacts 260. The opto-triac is a commercially available device used to isolate sensitive electronic devices from transient surges caused by switching large power loads. One or more load shedding relays 260 may be controlled which allows the utility company to shut down power to areas having low usage priority in the event of a power outage or high usage times. For example, a customer may reach an agreement with the utility company to cut the power to his home during a "brown out" period such that the additional energy may be used to power a nearby hospital. The load shedding relay 260 is capable of being activated by the utility company over the network to the data collection device 120 because the GSM, PACS, FDMA, CDMA or TDMA communications link is capable of two-way communication. In addition, a power wheeling device may be attached to universal meter reading 120. The power wheeling device would allow the utility consumer to compare the utility rates of various utility companies in the area. If the consumer finds a more competitive utility rate, the consumer is capable of switching to that utility company by using the power wheeling device and the universal meter reading 120.

In one embodiment, the universal meter reading 120 is located in an extension to an existing electric meter, but the data collection device 120 may be housed and mounted in a separate waterproof unit. In either case, the data collection device 120 can powered by an AC voltage obtained from the customer's utility power line. The AC voltage is stepped down by power electronics 224 where, preferably, a voltage signal of about 8 volts is produced. A battery backup 226 is provided when the AC power source is not capable of providing power to the data collection device 120. Preferably, the battery backup 226 is a gel cell battery having a long battery life. Also provided, with the data collection device 120, are security switches 228 that detect when the unit is tilted or when the cover to the unit is opened. When the security switches 228 are triggered, the data collection unit 210 is capable of reporting a security breach to the remote device 140, as shown in FIG. 3, over the communications network.

When the data has been processed by the data collection unit 120, it is then sent over the network using GSM, PACS, FDMA, CDMA or TDMA communications electronics 234 that are connected to the data collection unit 210 and an antenna 242. The GSM, PACS, FDMA, CDMA or TDMA communications electronics 234 allows data to be transmitted to the data user's facility over the control channel of a GSM, PACS, FDMA, CDMA or TDMA network. As explained earlier, the communications connection over the network is a two-way link which allows data to be sent to and from the remote device or location and the universal meter reading unit 120. As such, the interested party may communicate with the universal remote reader 120 to access data or other features (e.g., load shedding and power utilizing).

Referring to FIG. 5, the data collection device can also be connected to a telecommunications system wiring at a user's location 248 (e.g., the existing telephone wiring in a house) to create a connection to a wireless telecommunications network, such as a GSM, PACS, FDMA, CDMA or a TDMA network. As such, as shown in FIG. 5, a vocoder 244 and ring/tone generator 246 located within the data collection device 120 are connected to the existing telephone wiring 248. The ring/tone generator 246 is provided to create dial tone and ringing capabilities to the existing telephone wiring from the wireless telephone network. The vocoder 244 is used to convert voices to digital signals which are capable of being transmitted over the wireless network. This wireless telecommunications network connection replaces the need for wired telecommunications service because it established a wireless telecommunications interface at the location through the data collection device 120. In addition to providing wireless telephone service over the existing telephone wiring, the data collection device is capable of simultaneously performing all the functions described hereinabove.

Additionally, a method for collecting and transmitting data from the universal meter reading unit 120 is provided. First, analog and digital data is sensed at a first location. The analog data is subsequently converted into digital data. The digital data is processed into a desired format and is stored in a memory device. The processed digital data is transmitted over a wireless network to a remote device or location. In another embodiment, the transmission step is made over a wireless network control channel using GSM, PACS, FDMA, CDMA or TDMA digital technology.

In another embodiment, the data from the microprocessor 340 may be wirelessly transmitted to the data collection device over an unlicensed radio frequency band. As explained earlier, the data can be transmitted from the reader 300 to the data collection device using an LC transmitter circuit.

Additionally, a method is provided for monitoring utility usage data from a conventional utility meter having a rotatable disk. First, a beam of radiation is transmitted from a source and reflected off of the reflecting device to the rotatable disk. The beam is then reflected again off the rotatable disk back to the reflecting device where it is reflected toward an infrared detector and detected. The number of rotations of the disk is calculated from the number of times that the detector detects the infrared beam of light. The reader contains algorithms to prevent false readings caused by sunlight, other forms of optical interference or reverse meter rotation.

In another embodiment, a method for transmitting a data sequence via a personal communications personal communications system transmission protocol is disclosed. As discussed above, the personal communications system transmission protocol includes several standards of operation. These standards include a global system for mobility (GSM) technology network, a time division multiple access (TDMA) technology network or a code division multiple access (CDMA) technology network , frequency division multiple access (FDMA) technology network and personal access communications system (PACS) technology network, among others. Each of these technology networks employ the use of a digital control channel to direct communications to the correct location. Typically, the control channel is used to transmit a sequence of data that is used to direct voice or data communications to the correct destination via a personal communications system. A detailed discussion of the GSM and PCS transmission protocols can be found in the publication "An Introduction to GSM" by Michel Mouly and Marie-Bernadette Pautet published in 1993 by Northern Telecom, Inc. of Richardson, Tex.

A previous embodiment described the use of the digital control channel to transmit data from one device to another using a drop and add packet technique. The present embodiment employs the use of the short message portion of the personal communications system transmission protocol to transmit data from one device to another. Generally, the short message service portion of the personal communications system transmission protocol is a means to send a protocol specific number of characters of data to and from mobile subscribers (MS), i.e. a device capable of transmitting via the personal communications system. Another difference between the voice control channel and short message service is that the short message service operates at a slower speed within the control channel because of the specifics of the short message service operating protocol employed by the various technologies. For example, using the voice control channel, data could be transmitted to the data collection device to the remote device at 275 to 325 data groups per second and the data collection device can respond and send data groups at the same (or similar) rate depending upon control channel traffic loading. In the case of the short message service, data is transmitted at about 7 data groups per second.

Figure 8:
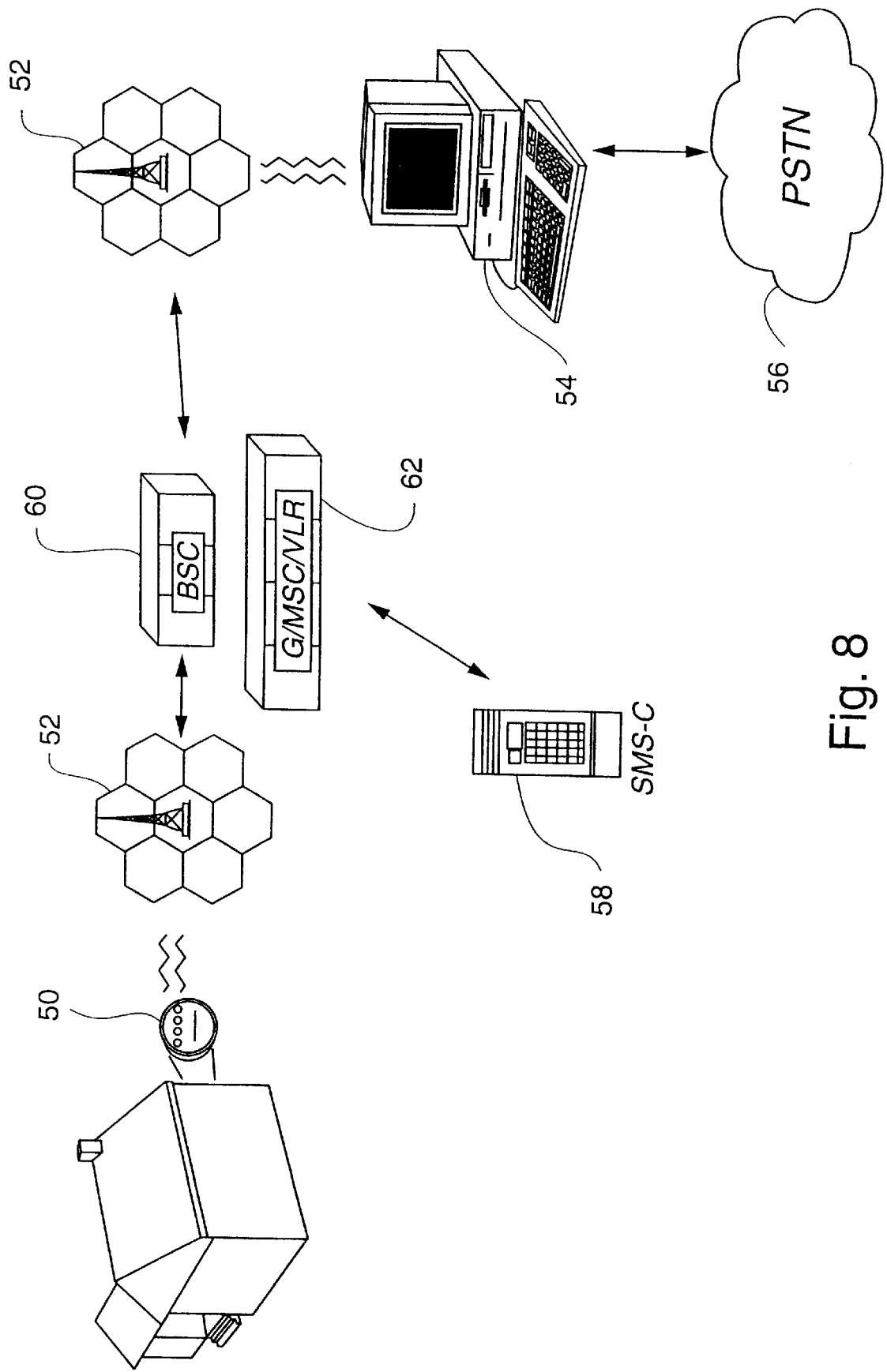
FIG. 8 is a diagram illustrating the transmission of data to and from a data collection unit via a personal communications system.

In the present invention, data is requested and the requested data is sent using the short message service portion of the personal communications system transmission protocol. As mentioned above, the short message service portion of the personal communications system transmission protocol is a means to send a protocol specific number of characters of data to and from a mobile subscriber (MS). In one embodiment, as shown in FIG. 8, the data collection device 50 is a mobile subscriber and the remote device 54 has the capability of contacting the remote device using the personal communications system network 52. The remote device 54 may be accessed through the public switched telephone network 56. Additionally, the connection of the remote device to a public switched telephone network 56 allows data to be sent to and from the remote device 54 via the public switched telephone network 56. For example, when a utility company is interested in receiving meter usage data from its customers, the utility company may connect via the public switched telephone network 56 to data collection device 50 using the remote device 54. The remote device 54 requests the data from the data collection device 50, and when the data is received by the remote device 54, it is transmitted to the utility company or a data collection center via the public switched telephone network 56 using a modem, for example.

Figure 7:
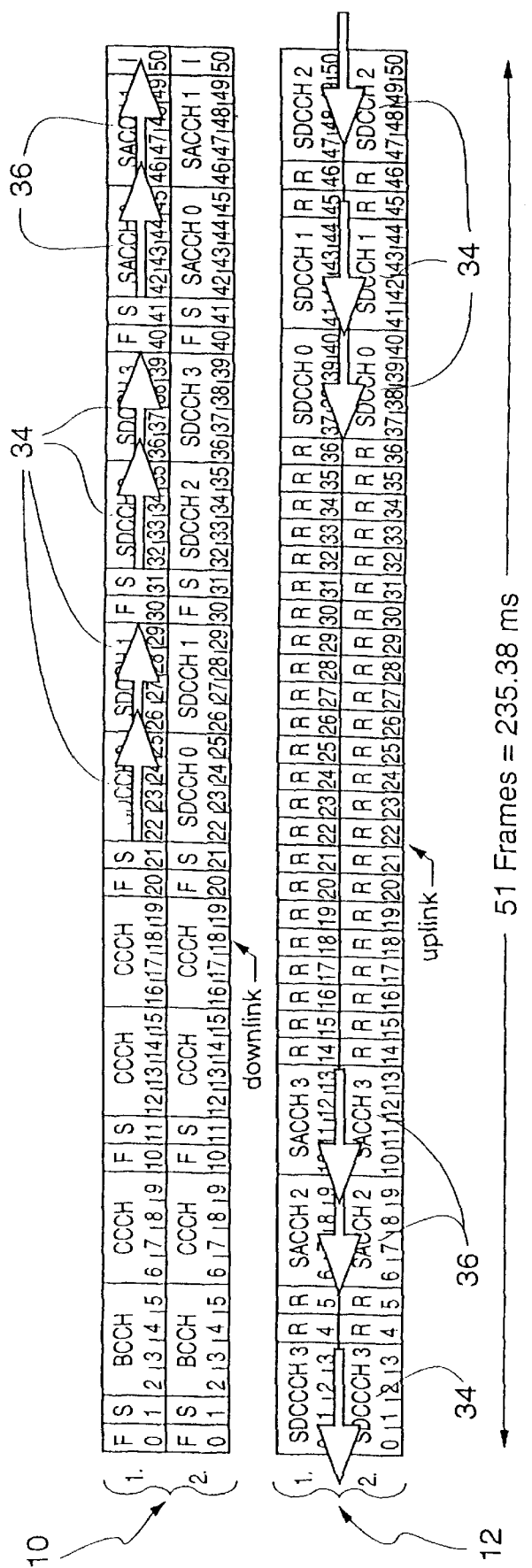
FIG. 7 is a diagram of the downlink and uplink portions of a control channel data sequence.

When a request for data is made, the remote device 54 encodes the request in the short message service portion of the control channel of the personal communications system transmission protocol. The data may be assembled into the control channel data sequence using various known techniques. In FIG. 7, one technique for assembling a short message service control channel data sequence is shown. The control channel, in FIG. 7, illustrates an downlink portion 10 and a uplink portion 12 of the control channel. In another embodiment, the control channel can include a stand-alone dedicated control channel (SDCCH) and/or a slow associated control channel (SACCH). As noted above, a detailed discussion of the GSM and PCS transmission protocols can be found in the publication "An Introduction to GSM" by Michel Mouly and Marie-Bernadette Pautet published in 1993 by Northern Telecom, Inc. of Richardson, Tex. The control channel contains a protocol specific number of characters per packet. Each of the packets has a specific significance in the protocol. In FIG. 7, data character units 34 and 36 may be used to transmit an intended short message from a remote device to a mobile subscriber. The present invention is capable of interpreting requests sent in the data character units 34 and 36 as a short message. In addition, the present invention is capable of composing short messages that contain the requested data. In composing the short message, the present invention may insert the requested data in the data character units 34 and 36 as a short message. After the data is added as a short message, the control channel sequences 10 and 12 may be transmitted from the remote device to the mobile subscriber and from the mobile subscriber to the remote device. As mentioned above, other techniques of assembling the control channel may be used.

The request for data is made by the remote device 54 and converted to short message service format, this request is transmitted using a wireless personal communications system network 52. The short message service data sequence is received at a base station controller (BSC) 60 which identifies the data as a short message. The BSC 60 transmits the short message using the mobile switching center (G/MSC/VLR) 62 to the short message center (SMS-C) 58. The request for data is then transmitted from the SMS-C 58 to the data collection device 50 through the G/MSC/VLR and BSC, using the wireless personal communications system network 52. The data collection device 50 responds to the request for data by interpreting the request and compiling the data that was requested. The compiled data is transmitted by the data collection device 50 using the short message service of the personal communications system transmission protocol. Similar to the request for data, the compiled data is inserted into the control channel data sequence as a short message. It should be appreciated that the data may be sent using multiple short messages in several control channel sequences. The control data sequence is then transmitted as a short message using the wireless personal communications system network 52 using the BSC 60 and the G/MSC/VLR

62. During this transmission, the BSC 60 identifies the control channel sequence as a short message and the sequence is sent to the SMS-C 58. The compiled data is then sent as a short message to the remote device 54 using the wireless personal communications system network 52. The remote device 54 receives and interprets the compiled data. As stated earlier, the assembly an disassembly of the request of data and the transmission packets in the control channel data sequence may be made using standard data packet assembly and disassembly techniques for standard short message service protocol technology.

Although the following disclosure has described the remote device 54 requesting data from the data collection device 50, it should be noted that the data collection device 50 may send data to the remote device 54 without being, first, prompted to send data. For example, the data collection device 50 may embody a security device in a home. Once a security breach is detected by the data collection device 50, this breach may be set via the short message service portion of control channel of the personal communications system transmission protocol to the remote device 54, using the above described method. Once the security breach is received by the remote device 54, further security precautions may be made, such as notifying law enforcement personnel.

Figure 6:
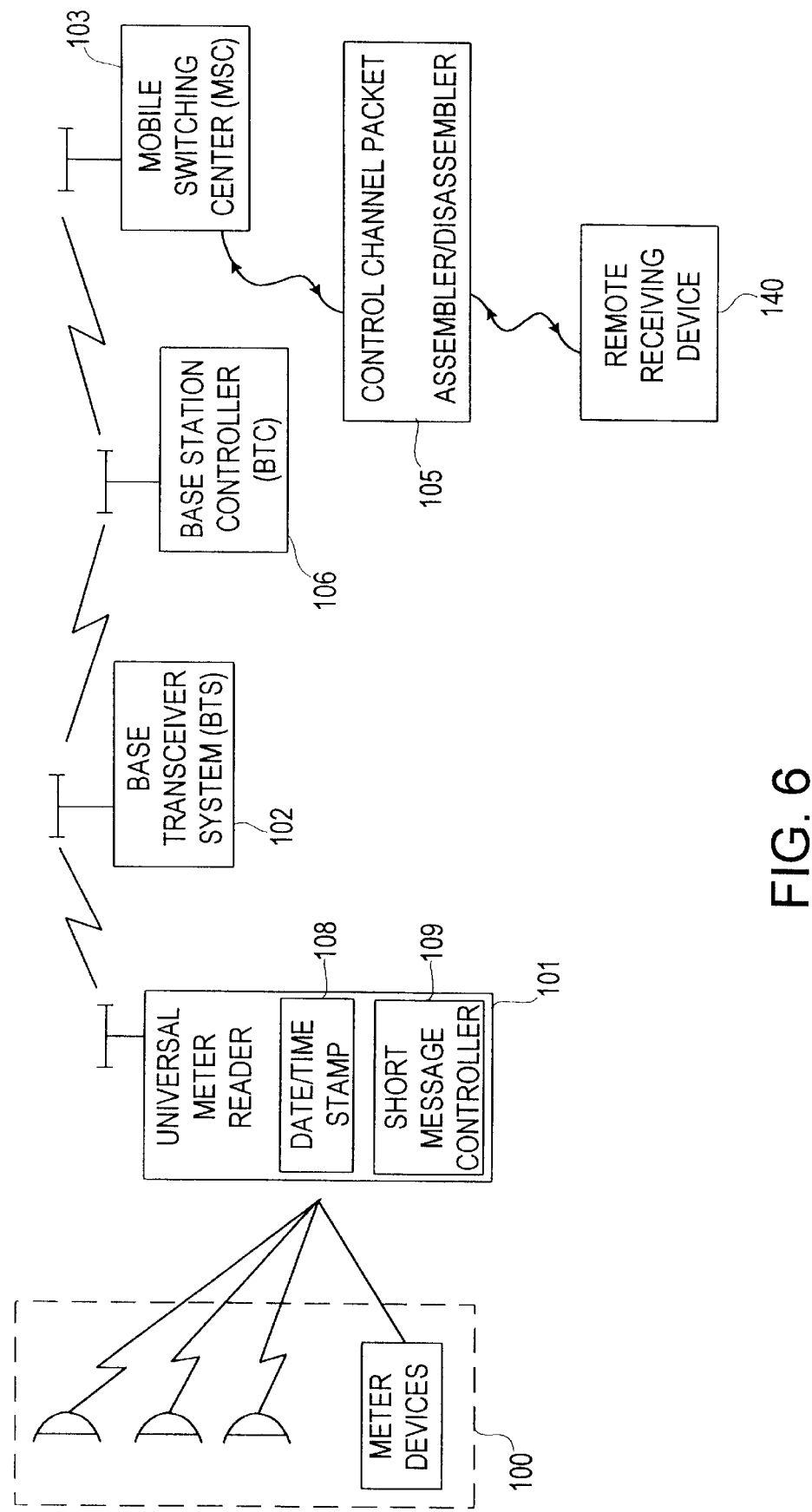
FIG. 6 is a block diagram of another embodiment of the communications system of the present invention including date/time stamp electronics and a short message controller.

In another embodiment as shown in FIG. 6, the data collection device 101 includes a device for data stamping the collected data. The date/time stamp device 108 is an electronic device that provides a time relationship to the collected data. As the data is retrieved from the meter or devices 100, the date/time stamp device 108 electronically assigns each data reading with the date/time that the data was collected. The collected data and its associated time stamp are capable of being stored in a data collection device, such as electronic memory, for later retrieval. As such, the saved data that is retrieved at a later time may be useful to develop usage profiles that reflect the amount and time the data was used. This type of usage profiling is beneficial when compiling power consumption data from a home or business.

In addition, the date/time stamp device 108 may be capable of adjusting data collection parameters such as the frequency of collection, related time stamp and notification of consumption. For example, the remote device 140 can instruct the data collection device 101 to collect data on an hourly interval and time/date stamp each reading when it is acquired. In addition, the remove device 140 can instruct the data collection device to terminate all power being supplied to a location if a predetermined consumption level is reached.

The data collection device 101 may also include a short message controller 109. The short message controller 109 is capable of interpreting a short message received from the remote device 140. The short message controller 109 is also capable of instructing the data collection device 101 to perform several data collection functions, such as to collect data and retrieve saved data. Once the data collection device 101 has performed the desired function, the short message controller 109 is capable of composing a short message that contains the requested data. The composed short message composed by the short message controller 109 is capable of being sent over the short message service portion of the personal communications system transmission protocol.

The foregoing discussion of the invention has been presented for purposes of illustration and description. Further, the description is not intended to limit the invention to the form disclosed herein. Consequently, variations and modifications commensurate with the above teachings, with the skill and knowledge of the relevant art, are within the scope of the present invention. The embodiment described hereinabove is further intended to explain the best mode presently known of practicing the invention and to enable others skilled in the art to utilize the invention as such, or in other embodiments, and with the various modifications required by their particular application or uses of the invention. It is intended that the appended claims be construed to include alternative embodiments to the extent permitted by the prior art.

What is claimed is:

1. A method for transmitting a data sequence via a personal communications system transmission protocol comprising the steps of:

composing at least one data packet including a request for data said at least one data packet including said request for data being in a form which conforms to conventional short message data packets;

transmitting said at least one data packet including said request for data from an access point to a data collection unit via a short message service portion of a control channel of the personal communications system transmission protocol as one or more short messages, wherein said step of transmitting said at least one data packet including said request for data includes the step of inserting said at least one data packet including said request for data into the control channel;

receiving said at least one data packet including said request for data at said data collection unit;

interpreting said request or data from said access point by said data collection unit;

compiling data from said data collection unit, said compiled data being requested in said request for data;

composing at least one data packet including, said compiled data, said at least one data packet including compiled data being in a form which conforms conventional short message data packets;

transmitting said at least one data packet including said compiled data from said data collection unit to said access point via said short message service portion of the control channel of the personal communications system transmission protocol as one or more short messages, wherein said step of transmitting said at least one data packet including said compiled data includes the step of inserting said at least one data packet including said compiled data into the control channel; and receiving said at least one data packet including said compiled data at said access point.

2. The method according to claim 1, wherein said steps of transmitting at least one data packet including said request for data and transmitting at least one data packet including said compiled data use the personal communications system transmission protocol of a network selected from the group consisting of a global system for mobility (GSM) technology network, a time division multiple access (TDMA) technology network, frequency division multiple access technology network (FDMA), personal access communications system technology network (PACS) or a code division multiple access (CDMA) technology network.

3. The method, according to claim 1, wherein said steps of transmitting at least one data packet including said request for data and transmitting at least one data packet including said compiled data use a stand-alone dedicated control channel (SDCCH) packet of said control channel of the personal communications system transmission protocol.

4. The method, according to claim 1, wherein said steps of transmitting at least one data packet including said request for data and transmitting at least one data packet including said compiled data use a slow associated control channel (SACCH) packet of said control channel of the personal communications system transmission protocol.

5. The method, according to claim 1, further comprising the steps of:

sensing analog data at a first location;

converting the sensed analog data to digital data; and processing the digital data.

6. The method, according to claim 1, further comprising the steps of:

collecting data at said data collection unit;

electronically stamping said collected data with a date and time that said data was collected by said collecting step; and storing said processed and electronically stamped data.

7. A method for transmitting a data sequence via a personal communications system transmission protocol comprising the steps of:

automatically collecting data at a data collection unit;

composing at least one data packet including said collected data, said at least one data packet including said collected data being in a form which conforms to conventional short message data packets;

inserting said at least one data packet including said collected data in a short message service portion of a control channel of the personal communications system transmission protocol as one or more short messages; and transmitting said at least one data packet including said collected data to an access point via said short message service portion of the control channel of the personal communications system transmission protocol as one or more short messages.

8. The method, according to claim 7, further including the steps of:

stamping said collected data with a date and time that said data was collected by said collecting step.

9. The method, according to claim 7, wherein the step of transmitting uses the personal communications system transmission protocol of a network selected from the group consisting of a global system for mobility (GSM) technology network, a time division multiple access (TDMA) technology network, a code division multiple access (CDMA) technology network, frequency division multiple access technology network (FDMA) or personal access communications system technology network (PACS).

10. The method, according to claim 7, further comprising the step of:

receiving said at least one data packet including said collected data at said access point; and interpreting said collected data at said access point.

11. An apparatus for collecting and digitally transmitting a data sequence via a personal communications system transmission protocol, said apparatus comprising:

means for automatically electronically collecting data at a first location;

means for composing at least one data packet including said electronically collected data, said data packet including said electronically collected data being in a form which conforms to a conventional short message data packet;

means for inserting said at least one data packet in a short message service portion of a control channel of the personal communications system transmission protocol as one or more short messages; and means for transmitting said at least one data packet to an access point via said short message service portion of the control channel of said personal communications system transmission protocol as one or more short messages.

12. The apparatus, according to claim 11, further comprising:

means for time and date stamping said collected data within a time and date that the data was collected.

13. The apparatus, according to claim 11, further comprising:

means for storing said collected data for subsequent transmission to an access point.

14. The apparatus, according to claim 11, wherein said means for transmitting uses the personal communications system transmission protocol of a network selected from the group consisting of a global system for mobility (GSM) technology network, a time division multiple access (TDMA) technology network, a code division multiple access (CDMA) technology network, frequency division multiple access technology network (FDMA) or personal access communications system technology network (PACS).

15. The apparatus, according to claim 11, further comprising:

means for receiving a data packet including a command from said access point, wherein said data packet including said command is in a form which conforms to a conventional short message service data packet and wherein said data packet including said command is transmitted via said short message service portion of the control channel of said personal communications system transmission protocol; and means for interpreting said command from said access point.

16. The method of claim 1 wherein, a plurality of data packets including said compiled data are received by the access point in response to said at least one data packet including said request for data made by the access point.

17. The method of claim 7 wherein the automatically collected data relates to a security breach.

18. The method of claim 7 wherein the automatically collected data relates to utility meter information.

19. The method of claim 7 wherein the data is automatically collected at some predetermined time.

20. The method of claim 7 wherein the data is automatically collected upon the occurrence of a particular event.

21. The method of claim 20 wherein the event is a security breach.

22. The apparat s of claim 7 wherein, a plurality of data packets including collected data are sent to the access point in response to one or more requests for data made by the access point, wherein said one or more requests for data are in a form which conforms to a conventional short message data packet.

23. The apparatus of claim 11 wherein the automatically collected data relates to a security breach.

24. The apparatus of claim 11 wherein the automatically collected data relates to utility meter information.

25. The apparatus of claim 11 wherein the data is automatically collected at some predetermined time.

26. The apparatus of claim 11 wherein the data is automatically collected upon the occurrence of a particular event.